United States Patent
Shibata et al.

(10) Patent No.: US 11,923,950 B2
(45) Date of Patent: Mar. 5, 2024

(54) RELAY DEVICE, RELAY METHOD, AND RELAY PROGRAM

(71) Applicant: NIPPON TELEGRAPH AND TELEPHONE CORPORATION, Tokyo (JP)

(72) Inventors: Naotaka Shibata, Musashino (JP); Hirofumi Yamamoto, Musashino (JP); Keita Takahashi, Musashino (JP); Noriyuki Ota, Musashino (JP); Jun Terada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 206 days.

(21) Appl. No.: 17/291,254

(22) PCT Filed: Oct. 25, 2019

(86) PCT No.: PCT/JP2019/041890
§ 371 (c)(1),
(2) Date: May 4, 2021

(87) PCT Pub. No.: WO2020/095719
PCT Pub. Date: May 14, 2020

(65) Prior Publication Data
US 2022/0006509 A1 Jan. 6, 2022

(30) Foreign Application Priority Data
Nov. 7, 2018 (JP) .................. 2018-209946

(51) Int. Cl.
*H04B 7/155* (2006.01)
*H04W 28/16* (2009.01)
*H04W 88/12* (2009.01)

(52) U.S. Cl.
CPC ........ *H04B 7/15507* (2013.01); *H04W 28/16* (2013.01); *H04W 88/12* (2013.01)

(58) Field of Classification Search
CPC .. H04B 7/15507; H04W 88/12; H04W 28/16; H04W 88/04; H04W 4/70; H04W 28/065;
(Continued)

(56) References Cited

U.S. PATENT DOCUMENTS

2005/0163090 A1   7/2005  Aoki
2006/0045054 A1*  3/2006  Utsumi ............ H04B 10/25754
                                                              455/422.1
(Continued)

FOREIGN PATENT DOCUMENTS

WO    WO-2004059882 A1    7/2004

OTHER PUBLICATIONS

Masahiro Fujii et al., Development of base station equipment for introduction of 3.5GHz band TD-LTE, NTT DOCOMO Technical Journal, vol. 24, No. 2, 2016, pp. 8-13.
(Continued)

*Primary Examiner* — Quoc Thai N Vu
(74) *Attorney, Agent, or Firm* — Harness, Dickey & Pierce, P.L.C.

(57) ABSTRACT

A relay device that relays between a plurality of radio devices that perform radio communication with terminals, and at least one radio control device that controls the radio devices, the relay device including: a replication necessity determination unit that determines whether or not to replicate a downlink signal received from the radio control device; a signal replicating unit that makes the same number of copies of a downlink signal as the number of destination radio devices only when the replication necessity determination unit determines that the downlink signal is to be replicated; and a downlink signal assignment unit that
(Continued)

transfers a downlink signal that has been determined by the replication necessity determination unit as a signal that is not to be replicated, and downlink signals replicated by the signal replicating unit, to the radio devices respectively corresponding thereto.

13 Claims, 2 Drawing Sheets

(58) Field of Classification Search
CPC ..... H04W 8/245; H04W 88/08; H04W 88/10; H04L 67/34; H04L 67/12
See application file for complete search history.

(56) References Cited

U.S. PATENT DOCUMENTS

| | | | | |
|---|---|---|---|---|
| 2012/0076058 | A1* | 3/2012 | Padmanabh | H04W 28/10 370/310 |
| 2014/0376426 | A1* | 12/2014 | Boudreau | H04L 47/41 370/294 |
| 2017/0086012 | A1* | 3/2017 | Jiménez | H04W 4/80 |
| 2018/0097690 | A1* | 4/2018 | Yocam | H04L 41/082 |

OTHER PUBLICATIONS

Anilu Umesh et al., 5G wireless access network standardization trend, NTT DOCOMO Technical Journal, vol. 25, No. 3, 2017, pp. 33-43.

* cited by examiner

RELAY DEVICE, RELAY METHOD, AND RELAY PROGRAM

CROSS-REFERENCE TO RELATED APPLICATIONS

This application is a 371 U.S. National Phase of International Application No. PCT/JP2019/041890 filed on Oct. 25, 2019, which claims priority to Japanese Application No. 2018-209946 filed on Nov. 7, 2018. The entire disclosures of the above applications are incorporated herein by reference.

TECHNICAL FIELD

The present invention relates to a relay device, a relay method, and a relay program.

BACKGROUND ART

Application of a distributed antenna system to a radio communication system such as a mobile communication system is in progress, in which a plurality of radio devices are controlled by one radio control device as one cell (service area). For example, as shown in FIG. 2, a relay device called an FHM (Fronthaul Multiplexer) is provided between a radio control device and a plurality of radio devices (for example, see NPL 1).

A relay device 1 shown in FIG. 2 relays between a plurality of radio devices (for example, a radio device A and a radio device B) that perform radio communication with terminals, and a radio control device (for example, a radio control device S) that controls the plurality of radio devices in a distributed antenna system. The relay device 1 includes a signal replicating unit 2 and a signal combining unit 3. The signal replicating unit 2 replicates a downlink signal transmitted from the radio control device S and transfers the replicated signals to the radio devices, respectively. The signal combining unit 3 combines uplink signals transmitted from the radio devices, and transmits the combined signal to the radio control device.

Signals adopted for an interface called a CPRI (Common Public Radio Interface) are transmitted and received via links between the radio control device and the radio devices. The signal replicating unit of the relay device makes the same number of copies of a CPRI downlink signal as the number of radio devices, and distributes the copies to the radio devices, respectively. The signal combining unit of the relay device combines CPRI uplink signals received from the radio devices. By arranging the relay device that has such functions, it is possible to build a cell that includes a plurality of radio devices, using one radio control device.

In addition to distributed antenna systems that use a relay device that distributes/combines CPRI signals, some distributed antenna systems use a relay device that distributes/combines RF (Radio Frequency) signals generated after radio signal processing has been fully completed.

Meanwhile, for future mobile communication systems, there is the issue of an increase in the amount of data transmitted between a radio control device and radio devices when CPRI signals that quantize IQ data of radio signal waveforms are used for transmission. Therefore, studies have been conducted to reduce the amount of transmission data by redefining the functional division between a radio control device and radio devices (for example, see NPL 2).

There are a plurality of candidates for the division point in the function division redefinition. According to NPL 2, for example, in the case of the LLS (Lower Layer Split), a radio control device holds the upper PHY (Physical) layer and the layers above it, and radio devices hold the lower PHY layer and the layers below it. In the case of the HLS (Higher Layer Split), a radio control device holds the PDCP (Packet Data Convergence Protocol) layer and the layers above it, and radio devices hold the lower RLC (Radio Link Control) layer and the layers below it.

On the other hand, according to a conventional CPRI division point, a radio control device holds the PHY layer and the layers above it, and radio devices only hold an RF function unit.

Regarding the LLS, an interface between a radio control device and radio devices is defined in the xRAN (extensible Radio Access Network). For example, a C-plane, which is control information, a U-plane, which is user data, and an S-plane, which is a signal for synchronization, are exchanged between a radio control device and radio devices. Also, an M-plane for controlling monitoring is also defined in the xRAN, and the status during operation can be monitored, for example.

CITATION LIST

Non Patent Literature

[NPL 1] Masahiro FUJII and three other authors, "NTT DOCOMO Technical Journal, Vol. 24, No. 2, GHz Tai TD-LTE Dounyu Ni Muketa Kitikyoku Souchi No Kaihatu (Base station apparatus development for introduction of 3.5 GHz band TD-LIE)", The Telecommunications Association, July 2016, pp. 8-13

[NPL 2] Umesh ANIL and four other authors, "NTT DOCOMO Technical Journal, Vol. 25, No. 3, 5G Musen Akusesu Nettowâku Hyouzyunka Doukou (5G wireless access network standardization trend)", The Telecommunications Association, October 2017, pp. 33-43

SUMMARY OF THE INVENTION

Technical Problem

In order to monitor all the radio devices individually, it is necessary to exchange the M-plane between the radio control device and the radio devices. On the other hand, in the case of a downlink signal, for example, in order to transmit the same signal from all the radio devices to radio terminals, the relay device needs to replicate and broadcast the U-plane.

However, in conventional relay devices, all downlink signals are replicated and distributed, and therefore the M-plane that is only required by a specific radio device is also distributed to radio devices to which the M-plane need not be transmitted.

In addition, in the case of an uplink signal, the relay device needs to combine the U-plane signals received by all the radio devices from radio terminals to improve the quality thereof, and transmit the combined signals to the radio control device.

However, with a conventional relay device, all uplink signals are subjected to combination, and M-planes that need not be combined are also combined. Thus, information cannot be read correctly.

An object of the present invention is to provide a relay device, a relay method, and a relay program that can replicate or combine signals after determining whether or not to do so for each signal.

Means for Solving the Problem

A relay device according to one aspect of the present invention is a relay device that relays between a plurality of radio devices that perform radio communication with terminals, and at least one radio control device that controls the radio devices, the relay device including: a replication necessity determination unit that determines whether or not to replicate a downlink signal received from the radio control device; a signal replicating unit that makes the same number of copies of a downlink signal as the number of destination radio devices only when the replication necessity determination unit determines that the downlink signal is to be replicated; a downlink signal assignment unit that transfers a downlink signal that has been determined by the replication necessity determination unit as a signal that is not to be replicated, and downlink signals replicated by the signal replicating unit, to the radio devices respectively corresponding thereto; a combination necessity determination unit that determines whether or not to combine uplink signals received from the plurality of radio devices; a signal combining unit that combines a plurality of uplink signals that have been determined by the combination necessity determination unit as signals that are to be combined, for each destination radio control device; and an uplink signal assignment unit that transfers uplink signals that have been determined by the combination necessity determination unit as signals that are not to be combined, and uplink signals combined by the signal combining unit, to the radio control device corresponding thereto.

In the relay device according to one aspect of the present invention, the replication necessity determination unit may determine whether or not to replicate a downlink signal based on at least one of sender information and destination information included in the downlink signal, and the combination necessity determination unit may determine whether or not to combine uplink signals based on at least one of sender information and destination information included in each uplink signal.

In the relay device according to one aspect of the present invention, the replication necessity determination unit may determine whether or not to replicate a downlink signal based on signal type information included in the downlink signal, and the combination necessity determination unit may determine whether or not to combine uplink signals based on signal type information included in each uplink signal.

In the relay device according to one aspect of the present invention, the replication necessity determination unit may determine whether or not to replicate a downlink signal based on a format of the downlink signal, and the combination necessity determination unit may determine whether or not to combine uplink signals based on a format of each uplink signal.

A relay method according to one aspect of the present invention is a relay method for relaying between a plurality of radio devices that perform radio communication with terminals, and at least one radio control device that controls the radio devices, the relay method including: a step of determining whether or not to replicate a downlink signal received from the radio control device; a step of making the same number of copies of a downlink signal as the number of destination radio devices only when the downlink signal is determined as a signal that is to be replicated; a step of transferring a downlink signal that has been determined as a signal that is not to be replicated, and replicated downlink signals, to the radio devices respectively corresponding thereto; a step of determining whether or not to combine uplink signals received from the plurality of radio devices; a step of combining a plurality of uplink signals that have been determined as signals that are to be combined, for each destination radio control device; and a step of transferring uplink signals that have been determined as signals that are not to be combined, and combined uplink signals, to the radio control device corresponding thereto.

A relay program according to one aspect of the present invention enables a computer to function as the units included in the above-described relay device.

Effects of the Invention

The present invention can replicate or combine signals after determining whether or not to do so for each signal.

DESCRIPTION OF EMBODIMENTS

Figure 1:
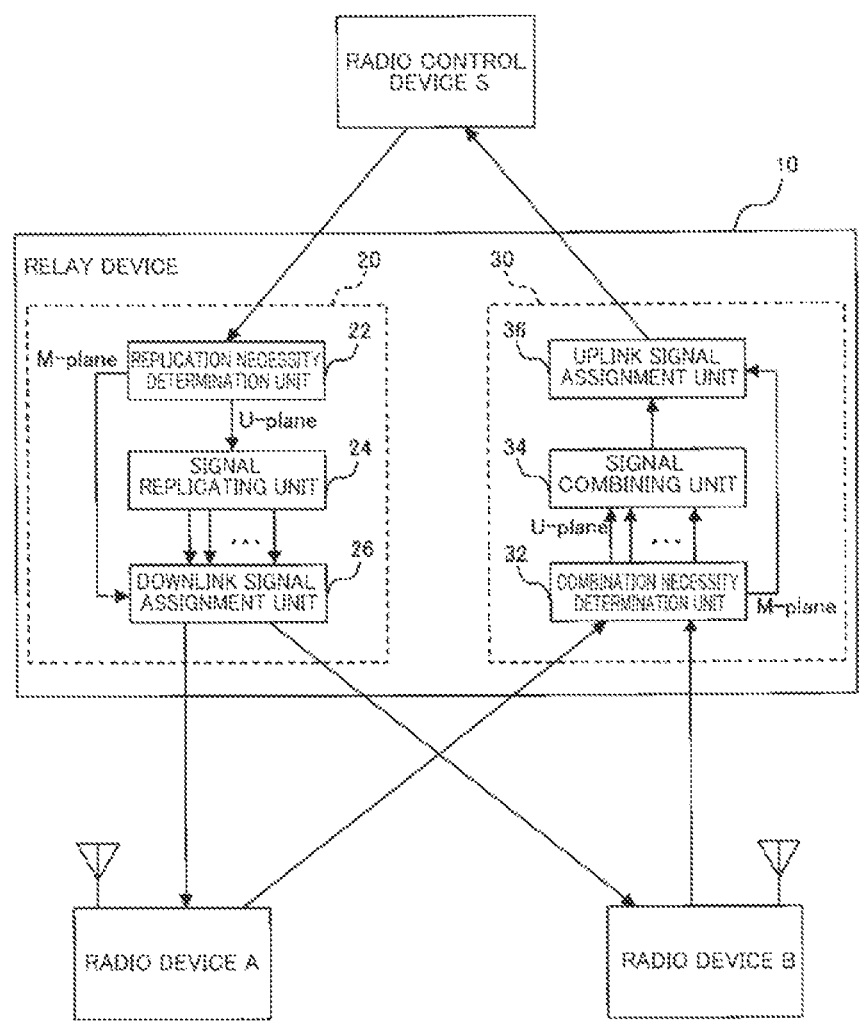
FIG. 1 is a diagram showing an example of a configuration of a relay device according to an embodiment, and surroundings thereof.
Figure 2:
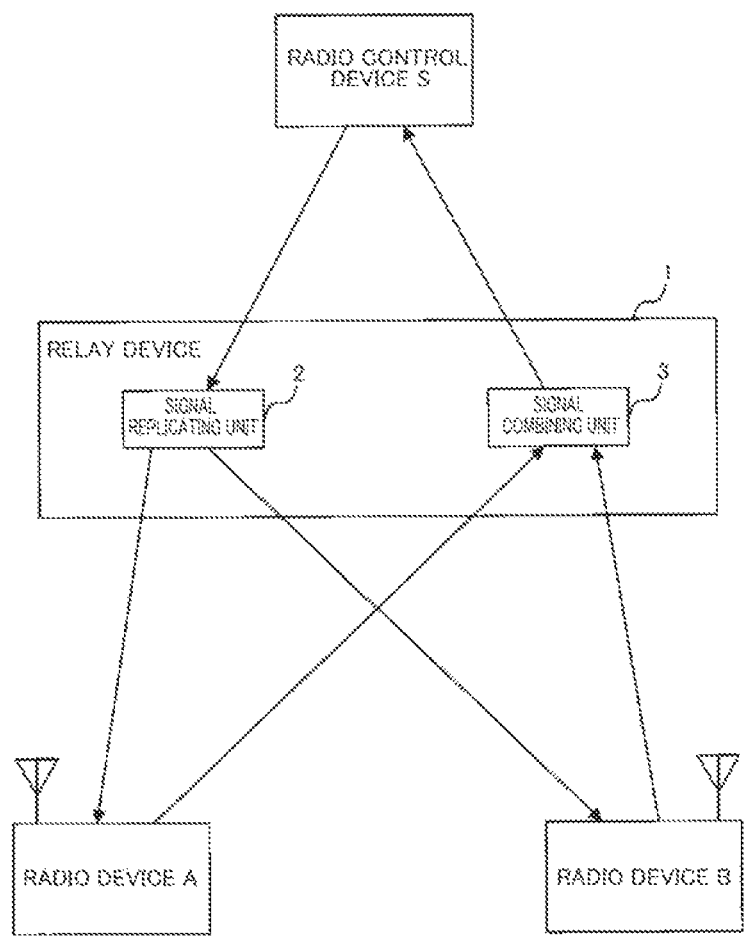
FIG. 2 is a diagram showing an example of a configuration of a conventional relay device, and surroundings thereof.

The following describes an embodiment of a relay device with reference to the drawings. FIG. 1 shows an example of a configuration of a relay device 10 according to an embodiment, and the surroundings thereof. The relay device 10 shown in FIG. 1 relays between a plurality of radio devices (for example, a radio device A and a radio device B) that perform radio communication with terminals, and at least one radio control device (for example, a radio control device S) that controls the plurality of radio devices in a distributed antenna system, for example. The relay device 10 includes a downlink signal processing unit 20 and an uplink signal processing unit 30, for example.

The downlink signal processing unit 20 includes a replication necessity determination unit 22, a signal replicating unit 24, and a downlink signal assignment unit 26.

The replication necessity determination unit 22 determines whether or not to replicate a downlink signal received from the radio control device S. For example, the replication necessity determination unit 22 may determine whether or not to replicate a downlink signal based on at least one of sender information and destination information included in the downlink signal.

For example, in the case of the xRAN, different IP addresses can be used for an M-plane and a C/U/S-plane.

Specifically, in the case of downlink communication, when the radio control device transmits a C/U/S-plane signal to the radio devices, the IP address in the sender information may be 192.168.1.10, and when the radio control device transmits an M-plane signal to the radio devices, the IP address in the sender information may be 192.168.1.20.

Therefore, by checking the sender information of downlink communication, the replication necessity determination unit 22 can determine whether the signal is an M-plane or a C/U/S-plane, i.e., determine the type of the signal.

Similarly, the radio control device may use a different IP address in the destination information for an M-plane and a C/U/S-plane, and the replication necessity determination unit 22 may determine whether the signal is an M-plane or a C/U/S-plane based on the IP address in the destination information of downlink communication.

Also, the replication necessity determination unit 22 may determine whether or not to replicate a downlink signal based on information indicating the type of the signal included in the downlink signal. For example, the replication necessity determination unit 22 may determine whether or not to replicate the downlink signal by using information indicating the type of a message included in the eCPRI Transport Header.

Also, the replication necessity determination unit 22 may determine whether or not to replicate a downlink signal based on the format of the downlink signal. The format of a signal, i.e. the frame configuration such as the header, is different for each protocol. For example, a protocol such as the eCPRI or the UDP is used for the U-plane, and a protocol such as the SSH or the NETCONF is used for the M-plane, and each has a different frame configuration. Therefore, it is possible to obtain information regarding the protocol by checking the frame configuration. Therefore, the replication necessity determination unit 22 may identify the type of the signal based on information regarding the protocol, and determine whether or not to replicate the signal.

The signal replicating unit 24 makes the same number of copies of a downlink signal as the number of destination radio devices only when the replication necessity determination unit 22 determines that the downlink signal is to be replicated.

The downlink signal assignment unit 26 transfers downlink signals that have been determined by the replication necessity determination unit 22 as signals that are not to be replicated, and downlink signals replicated by the signal replicating unit 24, to the radio devices corresponding thereto.

The uplink signal processing unit 30 includes a combination necessity determination unit 32, a signal combining unit 34, and an uplink signal assignment unit 36.

The combination necessity determination unit 32 determines whether or not to combine uplink signals received from a plurality of radio devices. For example, the combination necessity determination unit 32 may determine whether or not to combine uplink signals based on at least one of sender information and destination information included in each uplink signal.

As described above, in the case of the xRAN, different IP addresses can be used for an M-plane and a C/U/S-plane.

Specifically, in the case of uplink communication, when a radio device transmits a C/U/S-plane signal to the radio control device, the IP address in the sender information may be 192.168.1.1, and when a radio device transmits an M-plane signal to the radio control device, the IP address in the sender information may be 192.168.1.2.

Therefore, by checking the sender information in uplink communication, the combination necessity determination unit 32 can determine whether the signal is an M-plane or a C/U/S-plane, i.e., determine the type of the signal.

Similarly, the radio device may use a different IP address in the destination information for an M-plane and a C/U/S-plane, and the combination necessity determination unit 32 may determine whether the signal is an M-plane or a C/U/S-plane based on the IP address in the destination information of uplink communication.

Also, the combination necessity determination unit 32 may determine whether or not to combine uplink signals based on information indicating the type of the signal included in each uplink signal. For example, the combination necessity determination unit 32 may determine whether or not to combine the uplink signals by using information indicating the type of a message included in the eCPRI Transport Header.

Also, the combination necessity determination unit 32 may determine whether or not to combine uplink signals based on the format of the uplink signals. As described above, a protocol such as the eCPRI or the UDP is used for the U-plane, and a protocol such as the SSH or the NETCONF is used for the M-plane, and each has a different frame configuration. Therefore, it is possible to obtain information regarding the protocol by checking the frame configuration. Therefore, the combination necessity determination unit 32 may identify the type of the signals based on information regarding the protocol, and determine whether or not to combine the signals.

The signal combining unit 34 combines a plurality of uplink signals that have been determined by the combination necessity determination unit 32 as signals that are to be combined, for each destination radio control device.

The uplink signal assignment unit 36 transfers uplink signals that have been determined by the combination necessity determination unit 32 as signals that are not to be combined, and uplink signals combined by the signal combining unit 34, to the radio control device corresponding thereto.

Although FIG. 1 shows an example of a configuration of a distributed antenna system in which all of the radio devices connected to the relay device 10 belong to one radio control device S, the distributed antenna system is not limited to such a configuration. For example, the distributed antenna system may have a configuration in which a plurality of radio control devices (for example, radio control devices S1, S2, etc.) are arranged, and a plurality of radio devices (for example, radio devices A, B, C, etc.) connected to the relay device 10 each belong to one of the plurality of radio control devices. In such a case, the uplink signal assignment unit 36 transmits signals to each radio control device by assigning the signals thereto.

As described above, with the relay device 10 according to the embodiment, it is possible to replicate or combine signals after determining whether or not to do so for each signal.

Note that the functions of the downlink signal processing unit 20 and the uplink signal processing unit 30 of the relay device 10 may be implemented by using dedicated hardware, or implemented as a program on general-purpose hardware that is provided with a CPU and functions as a computer. In other words, the relay device 10 according to the present invention can be realized using a computer and a program, and the program can be recorded on a recording medium or provided through a network.

All of the above-described embodiments are merely illustrative of the embodiments of the present invention, and are not restrictive, and the present invention can be implemented in other various modified or altered modes.

REFERENCE SIGNS LIST

10 Relay device
20 Downlink signal processing unit
22 Replication necessity determination unit
24 Signal replicating unit
26 Downlink signal assignment unit
30 Uplink signal processing unit
32 Combination necessity determination unit
34 Signal combining unit
36 Uplink signal assignment unit

The invention claimed is:

1. A relay device that relays between a plurality of radio devices that perform radio communication with terminals, and at least one radio control device that controls the radio devices, the relay device comprising:
   a processor; and
   memory including a program, the program when executed by the processor performing functions including:
      determining whether or not to replicate a downlink signal received from the radio control device based on destination information included in the downlink signal, the destination information including a single destination address;
      making the same number of copies of a downlink signal as the number of destination radio devices only when the determining whether or not to replicate the downlink signal is that the downlink signal is to be replicated;
      transferring a downlink signal that has been determined as a downlink signal that is not to be replicated, and replicated downlink signals, to the radio devices respectively corresponding thereto;
      determining whether or not to combine uplink signals received from the plurality of radio devices;
      combining a plurality of uplink signals that have been determined as signals that are to be combined, for each destination radio control device; and
      transferring uplink signals that have been determined as signals that are not to be combined, and combined uplink signals, to the radio control device corresponding thereto.

2. The relay device according to claim 1, wherein the determining whether or not to replicate a downlink signal includes determining whether or not to replicate the downlink signal further based on sender information included in the downlink signal, and the determining whether or not to combine uplink signals includes determining whether or not to combine uplink signals based on at least one of sender information and destination information included in each uplink signal.

3. The relay device according to claim 1, wherein the determining whether or not to replicate a downlink signal includes determining whether or not to replicate the downlink signal further based on signal type information included in the downlink signal, and the determining whether or not to combine uplink signals includes determining whether or not to combine uplink signals based on signal type information included in each uplink signal.

4. The relay device according to claim 1, wherein the determining whether or not to replicate a downlink signal includes determining whether or not to replicate the downlink signal further based on a format of the downlink signal, and the determining whether or not to combine uplink signals includes determining whether or not to combine uplink signals based on a format of each uplink signal.

5. The relay device according to claim 1, wherein the determining whether or not to replicate a downlink signal received from the radio control device includes determining whether or not to replicate each downlink signal received from the radio control device.

6. The relay device according to claim 1, wherein the determining whether or not to combine uplink signals includes determining whether or not to combine each set of uplink signals received.

7. A relay method for relaying between a plurality of radio devices that perform radio communication with terminals, and at least one radio control device that controls the radio devices, the relay method comprising:
   a step of determining whether or not to replicate a downlink signal received from the radio control device based on destination information included in the downlink signal, the destination information including a single destination address;
   a step of making the same number of copies of a downlink signal as the number of destination radio devices only when the downlink signal is determined as a signal that is to be replicated;
   a step of transferring a downlink signal that has been determined as a signal that is not to be replicated, and replicated downlink signals, to the radio devices respectively corresponding thereto;
   a step of determining whether or not to combine uplink signals received from the plurality of radio devices;
   a step of combining a plurality of uplink signals that have been determined as signals that are to be combined, for each destination radio control device; and
   a step of transferring uplink signals that have been determined as signals that are not to be combined, and combined uplink signals, to the radio control device corresponding thereto.

8. The relay method according to claim 7, wherein the determining whether or not to replicate a downlink signal includes determining whether or not to replicate the downlink signal further based on sender information included in the downlink signal, and the determining whether or not to combine uplink signals includes determining whether or not to combine uplink signals based on at least one of sender information and destination information included in each uplink signal.

9. The relay method according to claim 7, wherein the determining whether or not to replicate a downlink signal includes determining whether or not to replicate the downlink signal further based on signal type information included in the downlink signal, and the determining whether or not to combine uplink signals includes determining whether or not to combine uplink signals based on signal type information included in each uplink signal.

10. The relay method according to claim 7, wherein the determining whether or not to replicate a downlink signal includes determining whether or not to replicate the downlink signal further based on a format of the downlink signal, and the determining whether or not to combine uplink signals includes determining whether or not to combine uplink signals based on a format of each uplink signal.

11. The relay method of claim 7, wherein the determining whether or not to replicate a downlink signal received from the radio control device includes determining whether or not to replicate each downlink signal received from the radio control device.

12. The relay method of claim 7, wherein the determining whether or not to combine uplink signals includes determining whether or not to combine each set of uplink signals received.

13. A non-transitory computer-readable medium having computer-executable instructions that, upon execution of the instructions by a processor of a computer, cause the computer to perform functions including:
   determining whether or not to replicate a downlink signal received from a radio control device based on destination information included in the downlink signal, the destination information including a single destination address;

making the same number of copies of a downlink signal as the number of destination radio devices only when the determining whether or not to replicate the downlink signal is that the downlink signal is to be replicated;

transferring a downlink signal that has been determined as a downlink signal that is not to be replicated, and replicated downlink signals, to the radio devices respectively corresponding thereto;

determining whether or not to combine uplink signals received from the plurality of radio devices;

combining a plurality of uplink signals that have been determined as signals that are to be combined, for each destination radio control device; and transferring uplink signals that have been determined as signals that are not to be combined, and combined uplink signals, to the radio control device corresponding thereto.

* * * * *